United States Patent

Davis

[11] Patent Number: 5,868,400
[45] Date of Patent: Feb. 9, 1999

[54] PUSH TYPE EXPANDING MANDREL APPARATUS

[75] Inventor: Kenneth Davis, Corning, Calif.

[73] Assignee: Lares Research, Chico, Calif.

[21] Appl. No.: 800,034

[22] Filed: Feb. 13, 1997

[51] Int. Cl.[6] .............................. B23B 31/40; B23B 31/20
[52] U.S. Cl. ........................................... 279/2.03; 279/143
[58] Field of Search .................................. 279/2.02–2.04, 279/143, 145

[56] References Cited

U.S. PATENT DOCUMENTS

| | | | |
|---|---|---|---|
| 2,399,831 | 5/1946 | Schmidt | 279/2.03 |
| 2,478,447 | 8/1949 | Arp . | |
| 2,555,170 | 5/1951 | Wall . | |
| 2,794,633 | 6/1957 | Delany . | |
| 2,812,186 | 11/1957 | Carlsen et al. . | |
| 2,970,843 | 2/1961 | Bourguignon | 279/2.03 |
| 3,104,885 | 9/1963 | Dunham | 279/2.03 |
| 4,201,394 | 5/1980 | Morawski . | |
| 4,373,411 | 2/1983 | Kanakaris . | |
| 4,465,244 | 8/1984 | Karr . | |
| 4,483,522 | 11/1984 | Nall et al. . | |
| 5,396,708 | 3/1995 | Whitley . | |

*Primary Examiner*—Steven C. Bishop
*Attorney, Agent, or Firm*—John P. O'Banion

[57] ABSTRACT

A push-type expanding mandrel apparatus that includes an expandable member with a tapered mandrel and a pushing member with a push rod. The body of the pushing member is held within a bore in a collet adapter that fits within the bore of a machine spindle, and the push rod enters a bore in the expanding member and tapered mandrel. Force applied to the back of the collet adapter is transferred to the pushing member at the interface of a tapered, inward facing shoulder in the bore of the collet adapter and a tapered hip on the body of the pushing member. As force is transferred to the pushing member, the push rod within the bore of the tapered mandrel exerts an outward force on the mandrel, causing leaves on the mandrel to expand outward and grip a workpiece from within a bore in the workpiece.

20 Claims, 4 Drawing Sheets

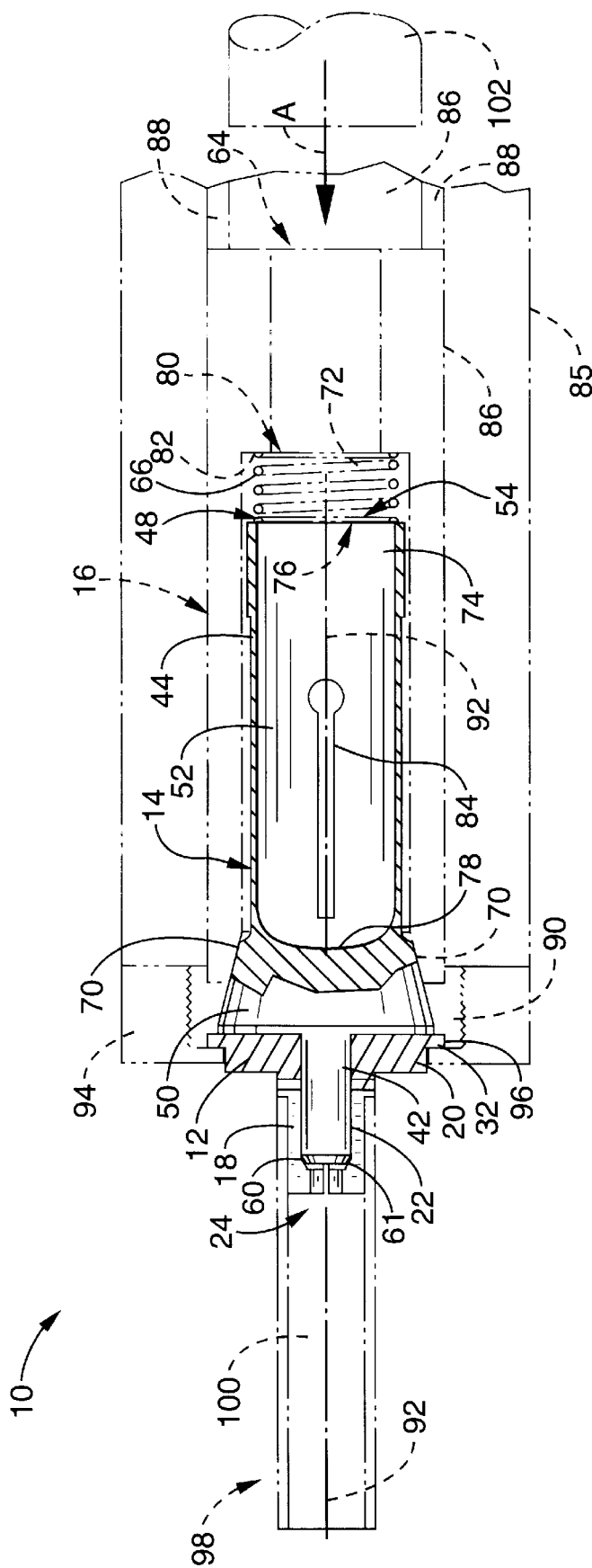
FIG. — 1

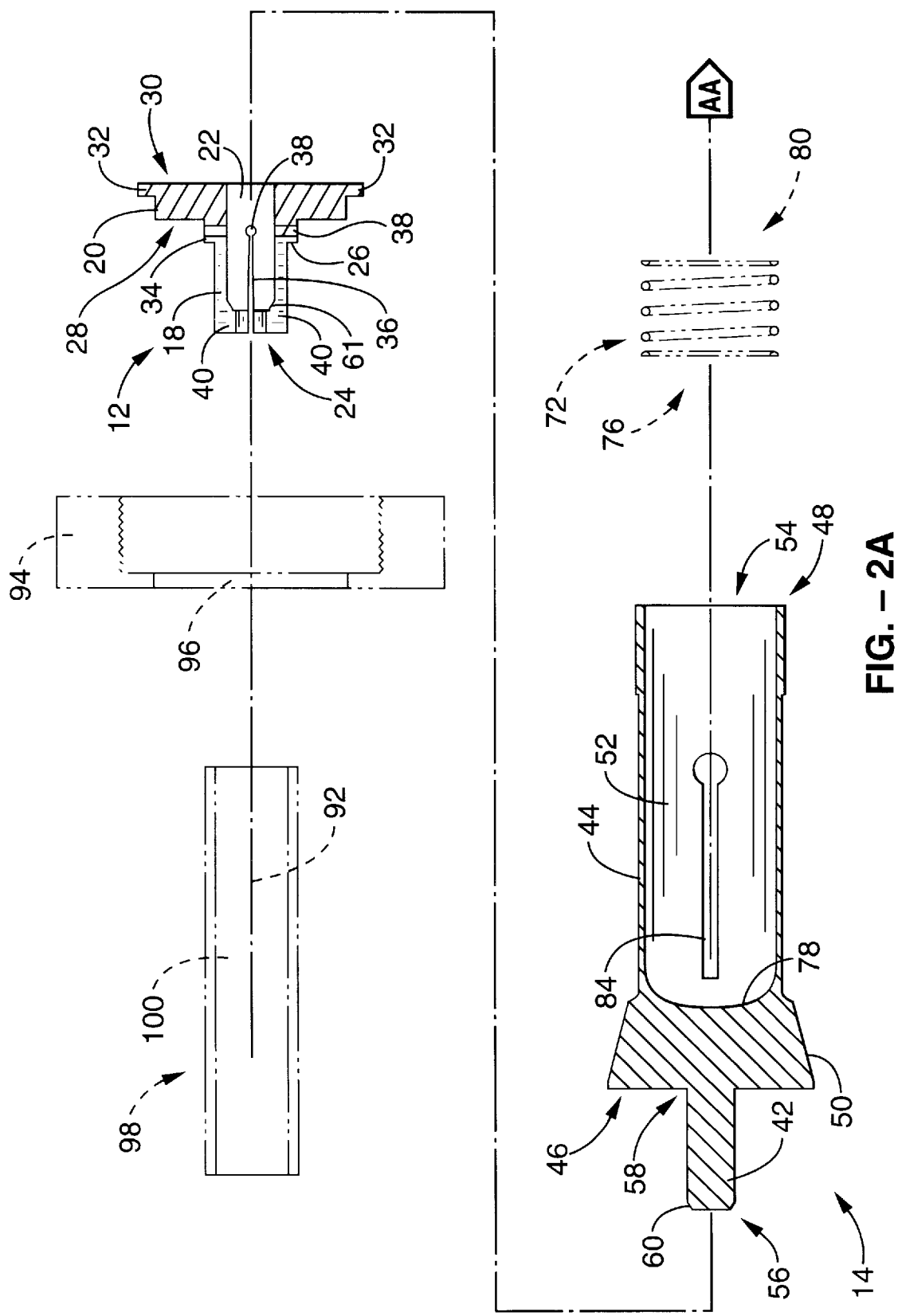

PUSH TYPE EXPANDING MANDREL APPARATUS

BACKGROUND OF THE INVENTION

1. Field of the Invention

This invention pertains generally to devices and methods for holding and centering an object, and more particularly to a push-type expanding mandrel apparatus which holds and centers a machined part by exerting an outward force against an internal portion of the machined part. The invention allows quick, releasable attachment of the machined part to an expanding mandrel, and automatically centers the machined part during attachment to the expanding mandrel.

2. Description of the Background Art

Modern computer numerically controlled (CNC) machines are designed to precisely move a cutting tool along a predetermined path relative to a workpiece during machining of the workpiece. Advanced CNC machine tools have multiple spindles which allow two or more workpieces to be machined simultaneously. The holding devices for the workpieces must be able to quickly and precisely position and center workpieces in exactly the same spot or position each time a workpiece is exchanged.

Numerous devices have been developed to hold and center workpieces. These devices include collapsible-type mechanisms wherein a collet or chuck tightens onto a portion of a workpiece, and expansible-type mechanisms wherein an expandable collet or chuck member is inserted into an internal bore or opening of a workpiece and expanded therein to grip or hold the workpiece on the expandable member. However, previously known devices for holding and centering workpieces have proven deficient in various respects. Particularly, the procedures for attaching and detaching the workpiece from the devices are relatively time consuming and complex, and can require the tightening and loosening of multiple parts with special chuck tools in order to attach and detach the workpieces, which adds to the time and cost ultimately required for preparation of machined parts. Another problem is that many devices are complex in design and include numerous movable parts which are subject to wear and failure. A further deficiency in currently available holding devices is that accurate centering of the workpiece is generally not provided quickly or automatically. The aforementioned drawbacks hinder the effective use of currently available holding devices with the advanced CNC machine tools used in modern manufacturing operations.

Accordingly, there is a need for a push-type expanding mandrel apparatus which quickly and releasibly holds a workpiece, which quickly and automatically centers a workpiece, and which is suitable for use with high speed, high precision CNC machine tools. The present invention satisfies those needs, as well as others, and generally overcomes the deficiencies found in the background art.

SUMMARY OF THE INVENTION

The present invention pertains to a push-type expanding mandrel apparatus which quickly and releasibly holds and centers a rotating workpiece or machined part. The apparatus can be used for holding rotating workpieces as well as holding parts in position for cross-drilling, milling and the like.

By way of example, and not of limitation, the invention comprises a cylindrical mandrel with a longitudinal bore and a plurality of longitudinal splits which define a plurality of leaves and a pushing member having a cylindrical push rod which engages the bore of the mandrel. The mandrel includes a front end and a back end, with the front end being sized and configured to fit into the inner bore of a part to be held. The bore extending through the mandrel is generally tapered down in diameter at the front end. The back end of the mandrel is joined to a generally cylindrical base with front and back ends. An annular flange is included on the base adjacent the back end of the base. The longitudinal bore in the mandrel extends through the attached base. The pushing member includes a cylindrical body with a longitudinal bore opening outward at a back end. A tapered hip is included at the front end of the cylindrical body, with the hip generally tapered in diameter from front to back. The push rod is joined to the front end of the body, and is received by the bore in the mandrel and base such that the back end of the base is adjacent the front end of the pushing member.

The invention can be used in conjunction with a conventional machine spindle having a push-type collet closing system. A collet adapter with a longitudinal bore would receive or accommodate the pushing member, and bias means for impact damping would be interposed between the collet adapter and pushing member. The back end of the collet adapter would be inserted into the bore of the machine spindle, with the spindle nut fitting over the mandrel and the mandrel extending out through an opening in the spindle nut. The spindle nut would thus hold the assembled mandrel, pushing member, collet adapter and damping spring together, with the mandrel being co-linear with the rotational axis of the machine spindle.

A workpiece with a bore or opening is mounted on the mandrel by inserting the mandrel into the bore of the workpiece. A collet closing force is then applied to the collet adapter by the machine spindle, with the closing force applied in a direction generally parallel to the rotational axis of the machine spindle and the attached expanding mandrel apparatus. The collet adapter transfers the collet closing force from the machine spindle to the push member by a transfer of force from the tapered, inward facing shoulders of the collet adapter to the tapered hip on the push member. As force is thus transferred to the push member, the push rod is moved or pushed forward. As the push rod moves forward, the end of the push rod transfers force to the mandrel along the tapered bore thereof, causing the leaves of the mandrel to expand outward. The outwardly expanding leaves of the mandrel, in turn, exert a force on the workpiece from within the bore or opening of the workpiece, thereby gripping or holding the workpiece onto the expanded mandrel. The workpiece is released from the mandrel by simply removing the collet closing force applied by the machine spindle to the collet adapter. The interfitting parts of the apparatus are machined to a close fit to ensure concentricity.

The damping spring between the collet adapter and push member exerts a light pre-load force on the pushing member, and thus the push rod and mandrel, to dampen the impact of the collet closing mechanism. The pre-load force exerted by the damping spring is sufficiently small such that the body of the pushing member is not expelled from the bore of the collet adapter.

An object of the invention is to provide a push type expanding mandrel apparatus which quickly and releasibly holds a workpiece on a machine spindle.

Another object of the invention is to provide a push type expanding mandrel apparatus which automatically and precisely centers a workpiece.

Another object of the invention is to provide a push type expanding mandrel apparatus which is quick and easy to use.

Another object of the invention is to provide a push type expanding mandrel apparatus which is suitable for use with machine spindles on CNC devices.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 1 is a side view in partial cross-section of a push-type expanding mandrel apparatus in accordance with the present invention shown attached to a machine spindle depicted in phantom.

FIG. 2A and 2B are an exploded view of the apparatus shown in FIG. 1.

DESCRIPTION OF THE PREFERRED EMBODIMENTS

Figure 2B:
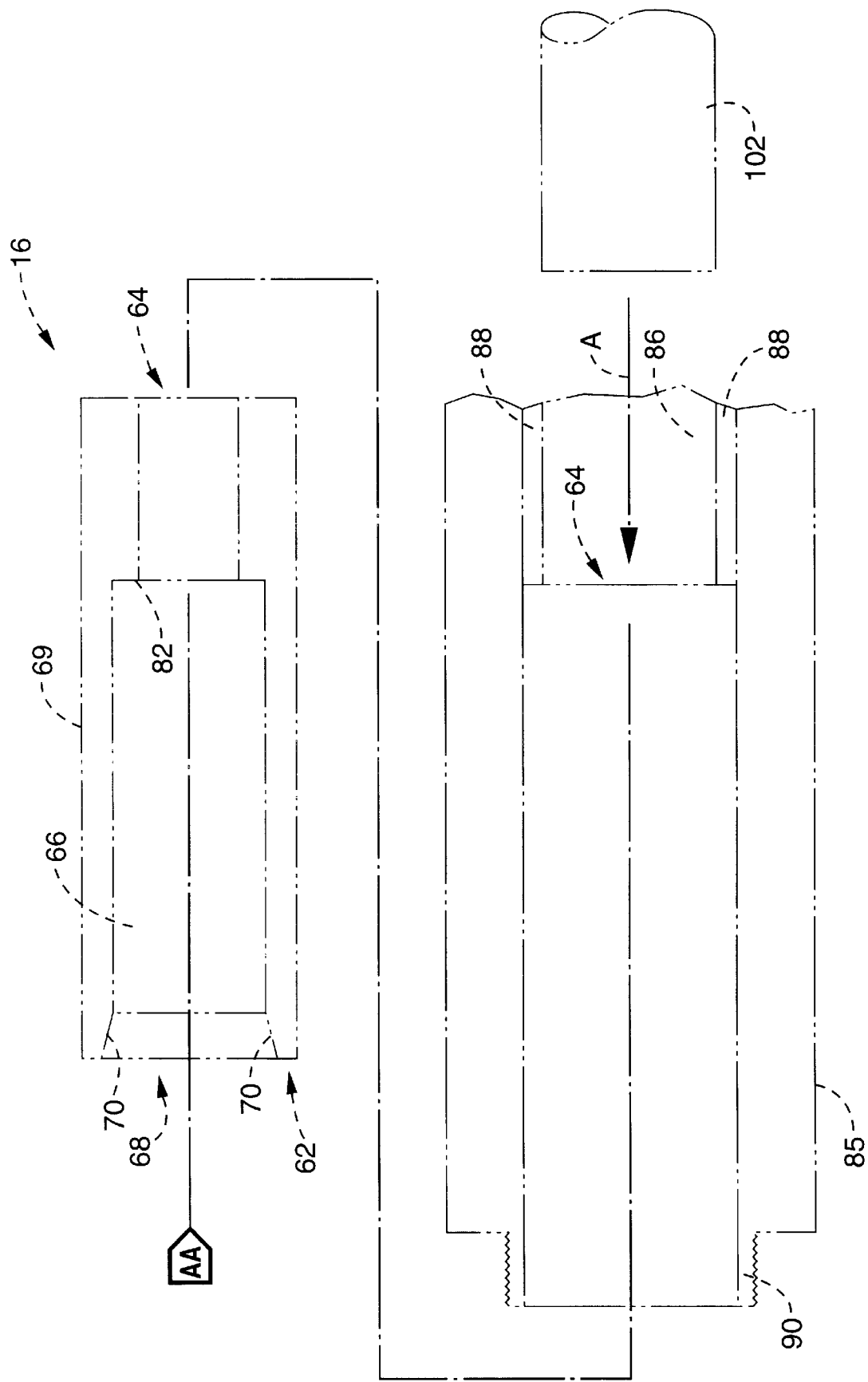
Figure 3:
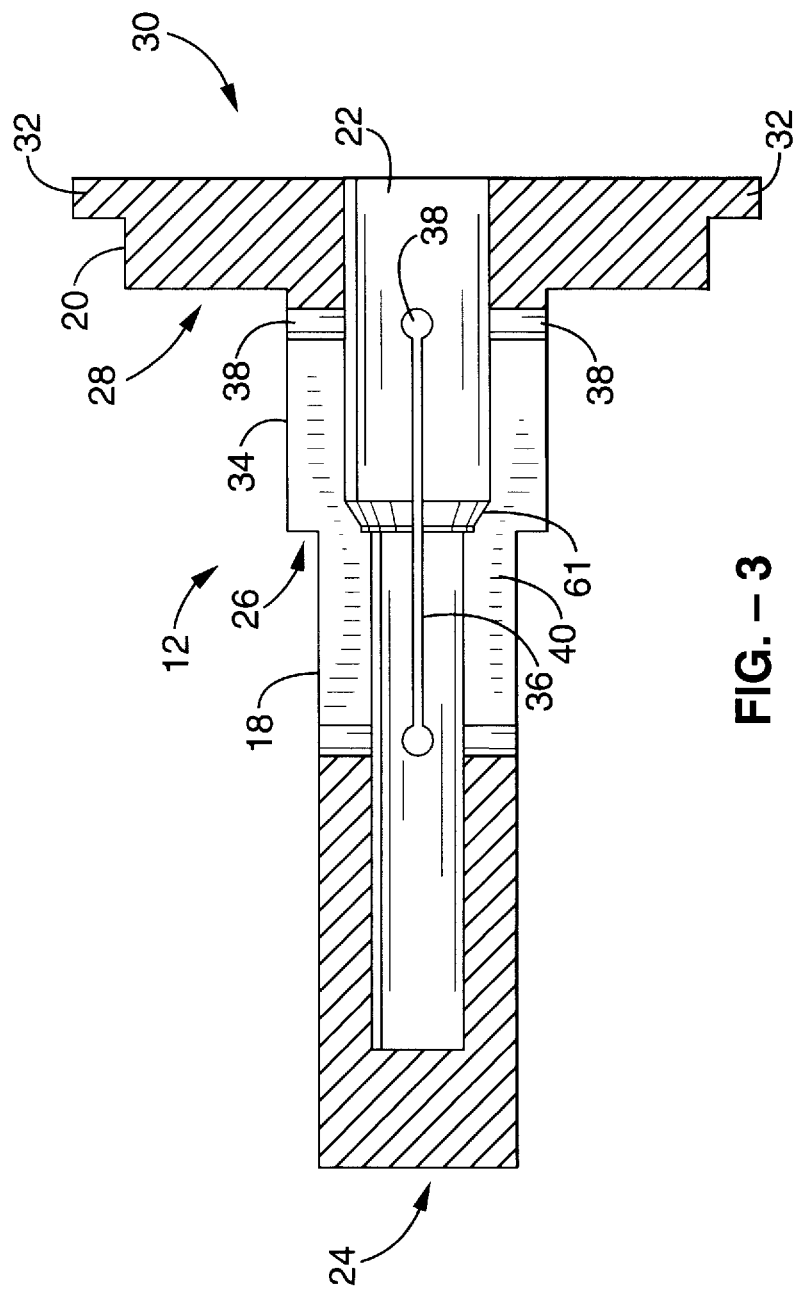
FIG. 3 is a side view in partial cross-section of an alternative embodiment of the mandrel portion of the apparatus shown in FIG. 1.

Referring more specifically to the drawings, for illustrative purposes the present invention is embodied in the apparatus generally shown in FIG. 1 through FIG. 3. It will be appreciated that the apparatus may vary as to configuration and as to details of the parts without departing from the basic concepts as disclosed herein. The invention is disclosed generally in terms of use with a machine spindle for holding stationary or rotating parts or other workpieces during machining with a cutting tool. It will be readily apparent, however, that the invention may be used for numerous applications wherein a part or other workpiece is releasibly mounted on and centered with respect to a rotational power source.

Referring now to FIG. 1 and FIG. 2, a push-type expanding mandrel apparatus 10 in accordance with the present invention is generally shown. The apparatus 10 comprises an expanding member 12 and a pushing member 14. Expanding member 12 includes a mandrel 18 and mandrel base 20, with a bore 22 extending longitudinally and centrally through mandrel 18 and base 20. Referring more particularly to FIG. 2A, mandrel 18 is generally cylindrical in structure and configuration, and includes a front end 24 and a back end 26. Base 20 is likewise of generally cylindrical structure and configuration, and includes a front end 28 and a back end 30. An annular flange 32 extends out from base 20 adjacent back end 30, and a shoulder or shelf 34 is included adjacent the front end 28 of base 20. The back end 26 of mandrel 18 is joined to front end 28 of base 20 at shelf 34. Referring also to FIG. 3, in the event that expanding member 12 does not provide for sufficient alignment of long workpieces, expanding member 12 can be fashioned with a solid forward end 104 as shown.

The outer surface of mandrel 18 is preferably configured to match the inner diameter configuration of a workpiece to be held. For example, in the embodiment shown, the outer surface of mandrel 18 is tapered in diameter from at front end 24 to provide for easy insertion into a workpiece having a tapered inner bore. Bore 22 within mandrel 18 has a generally cylindrical shape, and is tapered in diameter adjacent to front end 24 of mandrel 18 for expansion by pushing member 14. Note that the entire length of bore 22 does not need to be tapered. Bore 22 needs only be tapered in a portion such that it necks down to a diameter smaller than the push rod portion of pushing member 14 as described below. Mandrel 18 includes a plurality of longitudinal splits 36 between bore 22 and the outer surface of mandrel 18 and extending along the length of mandrel 18 and into shoulder 34 on base 20. A plurality of openings 38 are included on shelf 34 of base 20, with each split 36 communicating with a corresponding opening 38. A plurality of expandable leaves 40 are defined on mandrel 18 by splits 36. Preferably, there are four splits 36 which are radially positioned about the circumference of mandrel 18 at ninety degree intervals, to provide four expandable leaves 40. The number of splits 36 and leaves 40 may be varied as required, and arrangements of two, three, five, six or more splits 36 and leaves 40 are also contemplated for mandrel 12.

Pushing member 14, which can be machined from a standard collet blank or the like, includes a push rod 42 and a generally cylindrical body 44. Body 44 has a front end 46 and a back end 48, with a tapered hip 50 included on body 44 adjacent front end 46. Hip 50 is tapered in diameter generally from front end 46 of body 44 towards back end 48. A longitudinal, centrally located bore 52 of cylindrical shape is included within body 44, with bore 52 having an opening 54 at back end 48 of body 44.

Push rod 42 is of generally cylindrical shape and is structured and configured to slidably engage bore 22 in expandable member 12, with push rod 42 having a diameter which generally matches the diameter of the rear end of bore 22 in base 20 of expandable member 12 but is larger than the diameter of the tapered front end of bore 22. Push rod 42 has a forward end 56 and a back end 58, with back end 58 of push rod 42 joined to front end 46 of body 44. A tapered portion 60 matches the tapered front end of bore 22. The forward end 56 of push rod 42 interacts with and transfers force to a tapered interface 61 in bore 22 of mandrel 18, as discussed further below.

For purposes of context, a collet adapter 16 is shown as having a generally cylindrical structure and configuration, and including a front end 62, a back end 64, and a centrally located, longitudinal bore 66 of generally cylindrical shape. Bore 66 is shown as having an opening 68 at front end 62 of collet adapter 16, and is structured and configured to slidably receive or engage cylindrical body 44 on pushing member 14, with body 44 having a diameter which generally matches the diameter of bore 66. Note that bore 66 and cylindrical body 44 would preferably be machined to a close fit to ensure concentricity of collet adapter 16 and pushing member 14. An inward-facing tapered or beveled shoulder 70 is shown on collet adapter 16 adjacent front end 62, with the taper of shoulder 70 generally matching the taper of hip 50 on pushing member 14.

In the configuration shown, a damping spring 72 is interposed between collet adapter 16 and pushing member 14 as bias means. Spring 72, which is a standard machine configuration flat wound spring, fits within bore 52 of pushing member and bore 66 of collet adapter 16. Cylindrical body 44 of pushing member 14 slidably fits within bore 66 of collet adapter until tapered hip 50 on body 44 abuts or is positioned adjacent tapered shoulder 70 on collet adapter 16. In this way, when body 44 of pushing member 14 is thus engaged within bore 66 of collet adapter 16, an internal chamber 74 is defined between body 44 and collet adapter 16.

The expandable mandrel apparatus 10 is assembled by placing spring 72 within bore 66 of collet adapter 16, with front end 76 of spring adjacent back end 48 of body 14. The back end 48 of cylindrical body 44 is then inserted through opening 68 and into bore 66 of collet adapter 16 until back end 80 of spring 72 abuts back wall 82 of bore 66, and tapered shoulder 70 on collet adapter 16 is generally adjacent tapered hip 50 on body 44 of pushing member 16. Longitudinal slots 84 in body 44 of pushing member 14 allow air to escape from chamber 74 as body 44 enters bore 66 of collet adapter 16. Spring 72 applies a slight pre-load bias or force to pushing member 14 and collet adapter 16, to prevent tapered shoulder 70 on collet adapter 16 from interacting with or transferring force to tapered hip 50 on pushing member 14 until a collet closing force is applied to collet adapter 16, as described further below. However, the bias of spring 72 should not be great enough to expel body 44 of pushing member 14 from bore 66 of collet adapter 16. Front end 56 of push rod 42 is inserted into bore 22 in expandable member 12, and push rod 42 is engaged in bore 22 until taper 60 of front end 56 of push rod 42 contacts or interacts with the tapered portion 61 of bore 22 within mandrel 18.

The push-type expanding mandrel apparatus 10 is shown as structured and configured for use with a conventional machine spindle 85 of the type present on computer numerically controlled (CNC) machine tools (not shown). The collet adapter 16 of the CNC machine tool is inserted into bore 86 of machine spindle 85 until back end 64 of collet adapter 16 is adjacent sleeve 88 in bore 86, with expandable member 12 positioned adjacent to a threaded end 90 of spindle 85. The apparatus 10 thus positioned is longitudinally oriented and centered with the rotational axis 92 of spindle 85. The outer diameter 69 of collet adapter 16 is machined to have a precise fit within bore 86 of spindle 85 and bore 66 is machined to precisely fit body 44 of pushing member 14 within bore 66, in order to maintain the concentricity of pushing member 14 and the apparatus 10 generally with rotational axis 92. A threaded spindle nut 94 with an opening 96 fits over expandable member 12 and engages threaded end 90 of spindle 85 to hold the expanding mandrel apparatus 10 within bore 86 and generally secure the apparatus 10 to spindle 85, with mandrel 18 projecting out of spindle 85 through opening 96 in spindle nut 94.

A workpiece 98 with a longitudinal bore 100 is attached to the apparatus by inserting front end 24 of mandrel 18 into bore 100 and sliding workpiece 98 onto mandrel 18 until the workpiece is properly positioned for machining. Workpiece 98 is tightened or secured onto mandrel 18 by applying a collet closing force to collet adapter 16. Preferably, a closing rod 102 is actuated longitudinally within bore 86 of spindle to exert a closing force, shown by arrow A, by sliding forward within bore 86 and pushing against back end 64 of collet adapter 16. As collet adapter 16 is pushed forward or towards end 90 of spindle 85 by closing rod 102, the force from closing rod 102 is transferred to pushing member 14 at the interface of inward facing tapered shoulder 70 on collet adapter 16 and tapered hip 50 on pushing member 14. The force thus transferred moves pushing member 14 forward towards expanding member 12 and moves push rod 42 forward within tapered bore 22 of expanding member 12. Push rod 42, while moving forward within tapered bore 22, transfers force from push rod 42 and pushing member 14 to mandrel 18 at tapered interface 61, causing leaves 40 of mandrel to expand outward. The outward expanding leaves 40 of mandrel grip or bind workpiece 98 from within bore 100 while at the same time precisely centering workpiece 98 on mandrel 18. With the workpiece 98 thus secured and centered on mandrel 18, power can be provided to machine spindle 85 and the attached apparatus 10 and workpiece 98 in order to hold workpiece 98 during machining, cutting, or other operations. The closing force from closing rod 102 is maintained during holding and machining of workpiece 98 to retain workpiece 98 on mandrel 18.

Workpiece 98 is quickly and easily released from mandrel by simply removing the closing force applied by closing rod 102 to collet adapter 16 by retracting or withdrawing closing rod 102 back or away from back end 64 of collet adapter 16. With the closing force thus removed, the leaves 40 of mandrel 18 relax and move inward, forcing push rod 42 towards back end 30 of base 20, and releasing the grip of leaves 40 of mandrel 18 on workpiece 98. Workpiece 98 may then be removed from mandrel 18 and exchanged.

The collet closing force may alternatively be applied to collet adapter 16 by slidably actuating sleeve 88 within bore 86 so that sleeve 88 pushes on and transfers force to the back end 64 of collet adapter 16. The manner in which the collet closing force is applied to collet adapter 16 will vary with different types of machine spindles. Other conventional means for applying a force to collet adapter 16 in a direction generally parallel to rotational axis 92 may also be used with the invention to provide a collet closing force which would then be transferred to mandrel 18 as described above.

Spring 72 within chamber 74 provides a light pre-load force on the assembled pushing member 14 and collet adapter 16 to dampen the impact of closing rod 102 on the apparatus 10. The bias or load of spring 72, however, is sufficiently small in magnitude such that spring 72 does not cause push rod 42 to expand the leaves 40 of mandrel 18.

Accordingly, it will be seen that this invention provides a push-type expanding mandrel apparatus which quickly and releasibly holds and centers a workpiece. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus for holding a rotatable workpiece on a machine tool of the type having a spindle, a collet, and a push-type collet closing mechanism, comprising:

(a) a mandrel, said mandrel extending from a base member, said base member including an annular flange for coupling said base member to said spindle in a fixed axial position in relation to said spindle, said mandrel and said base member having a longitudinal bore, said mandrel including a plurality of longitudinal splits defining a plurality of leaves in said mandrel; and (b) a pushing member for slidable insertion into said collet, said pushing member including a push rod, said push rod slidably engaging said bore in said mandrel and said base member, wherein said leaves expand outward in response to axial extension of said push rod into said bore in said mandrel from a closing force applied to said pushing member by said collet closing mechanism.

2. An apparatus as recited in claim 1, further comprising a collet adapter, said collet adapter including a longitudinal bore, said longitudinal bore receiving said pushing member.

3. An apparatus as recited in claim 2, wherein said pushing member includes a tapered hip and wherein said collet adapter includes an inward facing tapered shoulder within said longitudinal bore.

4. An apparatus as recited in claim 3, wherein said pushing member has a cylindrical body, said cylindrical body includes front and back ends, said tapered hip is disposed on said front end of said cylindrical body, and said push rod is joined to said front end of said cylindrical body.

5. An apparatus as recited in claim 1, wherein said mandrel is joined to a base, said base having front and back ends, said base including an annular flange adjacent said back end, said mandrel joined to said base adjacent said front end, said bore in said mandrel extending through said base.

6. An apparatus as recited in claim 1, wherein said mandrel includes a front end and a back end, and wherein said bore in said mandrel is tapered adjacent to said front end of said mandrel.

7. An apparatus as recited in claim 2, wherein said longitudinal bore in said collet adapter includes a back end.

8. An apparatus as recited in claim 7, wherein said pushing member includes a back end and further comprising a damping spring positioned between said back end of said longitudinal bore in said collet adapter and said back end of said pushing member.

9. An apparatus for holding a rotatable workpiece on a machine tool of the type having a spindle, a collet, and a push-type collet closing mechanism, comprising:

(a) a mandrel, said mandrel extending from a base member, said base member including an annular flange for coupling said base member to said spindle in a fixed axial position in relation to said spindle, said mandrel and said base member having a longitudinal bore, said mandrel including a front end and a back end, said bore being tapered adjacent to said front end of said mandrel, said mandrel including a plurality of longitudinal splits defining a plurality of leaves in said mandrel; and (b) a pushing member for slidable insertion into said collet, said pushing member including a tapered hip, said pushing member including a push rod, said push rod slidably engaging said bore in said mandrel and said base member wherein said leaves expand outward in response to axial extension of said push rod into said bore in said mandrel from a closing force applied to said pushing member by said collet closing mechanism.

10. An apparatus as recited in claim 9, further comprising a collet adapter, said collet adapter including a longitudinal bore, said longitudinal bore receiving said pushing member, said collet adapter including an inward facing tapered shoulder within said longitudinal bore.

11. An apparatus as recited in claim 10, further comprising bias means for impact dampening interposed between said pushing member and said collet adapter.

12. An apparatus as recited in claim 9, further comprising a mandrel base, said base having front and back ends, said back end of said mandrel joined to said front end of said base, said base including an annular flange adjacent said back end, said bore in said mandrel extending through said base.

13. An apparatus as recited in claim 9, wherein said pushing member has a cylindrical body, said cylindrical body includes front and back ends, said tapered hip is disposed on said front end of said cylindrical body, and said push rod is joined to said front end of said cylindrical body.

14. An apparatus as recited in claim 10, wherein said longitudinal bore in said collet adapter includes a back end.

15. An apparatus as recited in claim 14, wherein said pushing member includes a back end and further comprising a damping spring positioned between said back end of said longitudinal bore in said collet adapter and said back end of said pushing member.

16. An apparatus as recited in claim 13, wherein said tapered hip is tapered in diameter from said front end of said cylindrical body towards said back end of said cylindrical body.

17. An apparatus for holding a rotatable workpiece on a machine tool of the type having a spindle, a collet, and a push-type collet closing mechanism, comprising:

(a) a cylindrical mandrel, said mandrel extending from a base member, said base member including an annular flange for coupling said base member to said spindle in a fixed axial position in relation to said spindle, said mandrel and said base member including a longitudinal bore, said bore extending through said base member and into mandrel, said mandrel including a front end and a back end, said bore being tapered in diameter adjacent to said front end of said mandrel, said mandrel including a plurality of longitudinal splits, said plurality of splits defining a plurality of leaves in said mandrel;

(b) a pushing member, said pushing member including a cylindrical body having a front end and a back end, said pushing member including a tapered hip adjacent said front end of said cylindrical body, said tapered hip being tapered in diameter from said front end of said cylindrical body towards said back end, said pushing member including a push rod, said push rod having a front end and a back end, said back end of said push rod joined to said front end of said cylindrical body, said push rod engaging said bore in said mandrel and said base member;

(c) a collet adapter for slidable insertion into said collet, said collet adapter including a longitudinal bore, said longitudinal bore slidably receiving said cylindrical body of said pushing member, said collet adapter including an inward facing tapered shoulder within said longitudinal bore, said wherein said leaves expand outward in response to axial extension of said push rod into said bore in said mandrel from a closing force applied to said collet adapter by said collet closing mechanism; and (d) bias means for impact damping, said bias means interposed between said pushing member and said collet adapter.

18. An apparatus as recited in claim 16, further comprising a mandrel base, said base having front and back ends, said back end of said mandrel joined to said front end of said base, said base including an annular flange adjacent said back end, said bore in said mandrel extending through said base.

19. An apparatus as recited in claim 18, wherein said longitudinal bore in said collet adapter includes a back end.

20. An apparatus as recited in claim 19, further comprising a damping spring positioned between said back end of said longitudinal bore in said collet adapter and said back end of said pushing member.

* * * * *